(12) United States Patent
Booh et al.

(10) Patent No.: US 7,535,446 B2
(45) Date of Patent: May 19, 2009

(54) LIQUID CRYSTAL ON SILICON (LCOS) DISPLAY DEVICE HAVING A UNIFORM CELL GAP

(75) Inventors: Seong-woon Booh, Suwon-si (KR); Su-ho Shin, Suwon-si (KR); Su-gun Kim, Taean-eub (KR); Jin-woo Cho, Seongnam-si (KR); Jong-min Wang, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 550 days.

(21) Appl. No.: 11/011,031

(22) Filed: Dec. 15, 2004

(65) Prior Publication Data

US 2005/0128173 A1 Jun. 16, 2005

(30) Foreign Application Priority Data

Dec. 15, 2003 (KR) .................. 10-2003-0091440

(51) Int. Cl.
G09G 3/36 (2006.01)
(52) U.S. Cl. .................. 345/87; 345/88; 345/89; 345/102; 345/104
(58) Field of Classification Search .............. 345/87–90, 345/175, 55, 690, 84, 32, 104, 156, 102, 345/581, 647; 359/586, 883, 585; 257/414; 349/158, 187, 139, 190, 156, 1, 130; 73/146.5, 73/54.37; 347/68, 70, 244, 12, 72
See application file for complete search history.

(56) References Cited

U.S. PATENT DOCUMENTS

| | | | |
|---|---|---|---|
| 4,811,004 A | * | 3/1989 | Person et al. ................ 345/175 |
| 5,432,526 A | * | 7/1995 | Hyatt ............................. 345/87 |
| 5,619,600 A | * | 4/1997 | Pohl ............................. 385/15 |
| 5,694,188 A | * | 12/1997 | Sano et al. ................... 349/139 |

(Continued)

FOREIGN PATENT DOCUMENTS

JP 2-178615 A 7/1990

(Continued)

OTHER PUBLICATIONS

N.W. Haggod, et al., "Simultaneous sensing and actuation using piezoelectric materials", SPIE Active and Adaptive Optical Components, vol. 1543, Jul. 1991, pp. 409-421, XP008044728.

*Primary Examiner*—Prabodh M. Dharia
(74) *Attorney, Agent, or Firm*—Sughrue Mion, PLLC

(57) ABSTRACT

A liquid crystal on silicon (LCOS) device includes a wafer, glass, and walls formed at opposite ends of an upper surface of the wafer to define a predetermined cell gap between the glass and the wafer. A thin piezo-electric layer is attached onto a surface of the wafer and an electrode is applied with external power to expand and/or contract the thin piezo-electric layer. The LCOS device further includes a voltage detection unit for detecting a voltage generated by the deformation of the thin piezo-electric layer; and a feedback control unit for compensating for deformation of the thin piezo-electric layer according to the voltage detected by the voltage detection unit. The LCOS device achieves uniformity of the cell gap by adjusting the voltage level of the thin piezo-electric layer after bonding the wafer and the glass, and therefore, spacers are not required.

7 Claims, 2 Drawing Sheets

U.S. PATENT DOCUMENTS

| | | | |
|---|---|---|---|
| 5,741,966 A * | 4/1998 | Handfield et al. | 73/146.5 |
| 5,841,503 A * | 11/1998 | Yoshino et al. | 349/158 |
| 5,896,162 A * | 4/1999 | Taniguchi | 347/244 |
| 6,075,512 A | 6/2000 | Patel et al. | |
| 6,176,571 B1 * | 1/2001 | Kishima et al. | 347/70 |
| 6,333,728 B1 * | 12/2001 | Libsch et al. | 345/90 |
| 6,484,567 B1 * | 11/2002 | Hajduk et al. | 73/54.37 |
| 6,497,476 B1 * | 12/2002 | Namba et al. | 347/68 |
| 6,639,648 B2 * | 10/2003 | Kataoka | 349/198 |
| 6,681,005 B2 * | 1/2004 | Liao et al. | 379/187 |
| 6,910,751 B2 * | 6/2005 | Groninger et al. | 347/12 |
| 6,992,826 B2 * | 1/2006 | Wang | 359/585 |
| 7,253,488 B2 * | 8/2007 | Zhan et al. | 257/414 |
| 2002/0005918 A1 * | 1/2002 | Kataoka | 349/1 |
| 2002/0163741 A1 * | 11/2002 | Shibazaki | 359/819 |
| 2002/0186343 A1 * | 12/2002 | Liao et al. | 349/187 |
| 2004/0017537 A1 * | 1/2004 | Magana et al. | 349/187 |
| 2004/0027701 A1 * | 2/2004 | Ishikawa | 359/883 |
| 2005/0122464 A1 * | 6/2005 | Lu | 349/190 |
| 2006/0072063 A1 * | 4/2006 | Kim et al. | 349/156 |
| 2007/0002103 A1 * | 1/2007 | Wasa et al. | 347/72 |
| 2007/0030228 A1 * | 2/2007 | Chow | 345/89 |

FOREIGN PATENT DOCUMENTS

| | | |
|---|---|---|
| JP | 7-191306 A | 7/1995 |
| JP | 10-104589 A | 4/1998 |
| KR | 2002-0039787 A | 5/2002 |

* cited by examiner

LIQUID CRYSTAL ON SILICON (LCOS) DISPLAY DEVICE HAVING A UNIFORM CELL GAP

CROSS-REFERENCE TO RELATED APPLICATIONS

This application claims priority from Korean Patent Application No. 2003-91440, filed Dec. 15, 2003, in the Korean Intellectual Property Office, the disclosure of which is incorporated herein by reference.

BACKGROUND OF THE INVENTION

1. Field of the Invention

Apparatuses and methods consistent with the present invention relate to a display device, and in particular but not exclusively, relate to a liquid crystal on silicon (LCOS) display device having pixel arrays on a silicon wafer.

2. Description of the Related Art

The age of multimedia has arrived, and a user's demand for large-sized display devices is appreciably increasing, which accelerates the development of the large-sized display devices. Existing cathode ray tube (CRT) projectors have limitations in regard to resolution and luminance. This shortcoming has been offset by recently developed liquid crystal display (LCD) projectors or digital light processor (DLP) projectors.

A display device including liquid crystal on silicon (LCOS) has also been recently proposed, providing higher sharpness, resolution and luminance compared to the CRT, and thus, providing improved overall image quality.

The LCD has a light-transmissive structure in which the liquid crystal is injected between patterned glass substrates and sealed, allowing light emitted from a lamp to pass through the glass substrates. On the other hand, the LCOS has a light-reflective structure in which pixel electrodes are arranged on a silicon substrate, causing light emitted from a lamp to reflect. The transmissive type LCD requires address lines to drive pixel electrodes, which causes the light transmission to be reduced. Also, a grid pattern appears in the LCD, causing the image quality deterioration. The reflective type LCOS can realize a system offering good brightness because pixel driving electrodes do not block the light and therefore increase the light transmission. Also, the LCOS display device can realize a high resolution because it has pixels on a silicon substrate using a semiconductor fabrication process, and advantageously has a high production yield and is also suitable for mass-production. Since the utilization of the semiconductor fabrication process does not require additional investments for production facilities, the LCOS display device has a competitive price.

One of the important parameters for the prevention of image quality deterioration in the display devices using the liquid crystals such as LCD and LCOS display devices is the uniformity of cell gap between two substrates, where the liquid crystals is located. It is important to keep the cell gap uniform because a response speed (converting speed from black to white or from white to black), a contrast, a visual angle, and a luminance of the characteristics of liquid crystal cells have a close relationship with the thickness of the liquid crystal layer. If there is non-uniformity, then the transmittance of light that penetrates through the cell gap loses consistency, causing non-uniform luminance. A solution to this problem is becoming more important because the display devices using the liquid crystals are in the process of shifting from a compact size to a large-size. It has been attempted to solve this problem by the placement of spacers, each having a predetermined size, on a screen unit.

FIG. 1 is a cross-section view of an LCOS display device having a uniform cell gap by the presence of spacers. The LCOS display device comprises a wafer 10, a glass 20, walls 22 oppositely disposed between the wafer 10 and the glass 20 and containing therein a sealant 23 for protecting the liquid crystals, and spacers 25 placed on a screen unit where pixels exist to maintain a uniform cell gap.

The spacer 25 is an important factor in the above structure to keep the cell gap uniform. In the absence of the spacers 25 as shown in FIGS. 2A and 2B, the cell gap between the wafer 10 and the glass 20 may irregularly change. The reason for the deformation of the cell gap is a difference in thermal expansion rates between the glass 20 and the wafer 10 by heat generated during the bonding process thereof. That is, when the temperature decreases to a room temperature after the bonding process at a high temperature, the glass 20 and the wafer 10 contract differently so that the glass 20 and the wafer 10 have difference curvatures when they are hardened. As a result, the cell gap does not have uniformity. Also, even if the uniformity of the gap is maintained right after the manufacturing process, the cell gap may be deformed by the heat generated during the service of the product, which also causes the image quality deterioration.

Accordingly, in the manufacturing of an LCOS display device, the placement of the conventional spacers 25 in the LCOS display device is necessary to solve the non-uniformity problem of the cell gap. However, the placement of the spacers 25 itself is sometimes impossible in certain kinds of crystal liquid materials. For example, the placement of the spacers 25 is possible in the TN (Twist Nematic) method, whereas the crystal liquid materials used in the VA (Vertical Alignment), although having a very glaring contrast, has a defective orientation when the spacers are placed therein.

Therefore, deterioration of the image quality is caused due to it being impossible to place the spacers during the manufacture of an LCOS display device, and therefore, there is a demand for the substitution for the conventional spacers.

SUMMARY OF THE INVENTION

An exemplary aspect of the present invention is to provide provides an LCOS display device which alleviates, without requiring spacers, disadvantages due to uneven cell gap which may be generated during the manufacturing of the product or service of the product.

In an exemplary embodiment, a liquid crystal on silicon (LCOS) display device comprises a wafer; a glass; walls formed at opposite ends of an upper surface of the wafer to define a predetermined cell gap between the glass and the wafer; a thin piezo-electric layer attached onto a surface of the wafer; and an electrode being applied with external power to expand and/or contract the thin piezo-electric layer.

The thin piezo-electric layer is attached onto either an upper surface of the wafer or a lower surface of the wafer, however, it is preferred, but not necessary, that the thin piezo-electric layer is attached onto the lower surface of the wafer for the conveniences of manufacturing and wiring.

It is also contemplated that the LCOS display device further comprises: a voltage detection unit for detecting a voltage generated by the deformation of the thin piezo-electric layer; and a feedback control unit for compensating the deformation of the thin piezo-electric layer according to the voltage detected by the voltage detection unit.

The LCOS display device achieves uniformity of the cell gap by adjusting the voltage level of the thin piezo-electric layer after bonding the wafer and the glass, and therefore, it is not required to use spacers. Also, when the wafer suffers from deformation due to heat or other reasons during the service of product, the deformation can also be compensated.

BRIEF DESCRIPTION OF THE DRAWINGS

The above aspect and other advantages of the present invention will be more apparent by describing exemplary embodiments of the present invention with reference to the accompanying drawings, in which.

DETAILED DESCRIPTION OF EXEMPLARY, NON-LIMITING EMBODIMENTS

Hereinafter, exemplary embodiments of the present invention will be described in detail with reference to the accompanying drawings.

Figure 1:
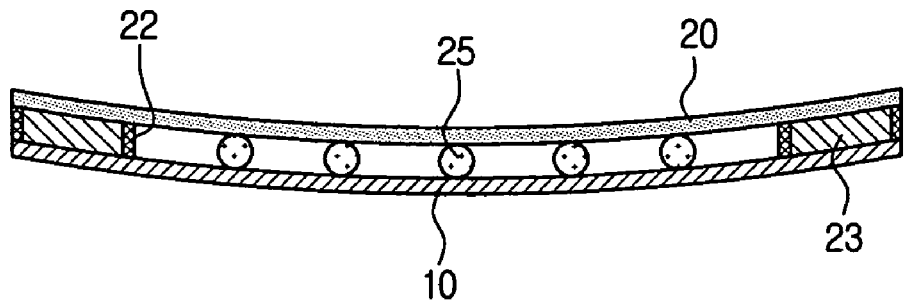
FIG. 1 is a cross section view of an LCOS display device using conventional spacers to keep the cell gap uniform.
Figure 2A:
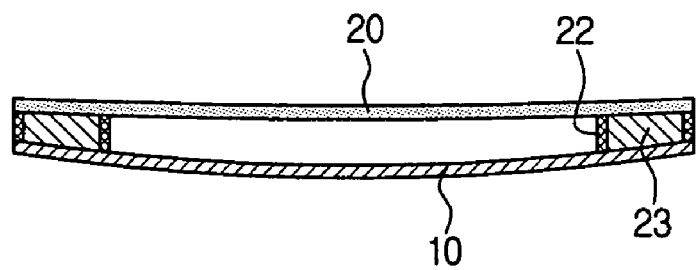
FIGS. 2A and 2B are cross section views showing the deformations of the cell gap generated when there is no spacer in the conventional LCOS display device.
Figure 2B:
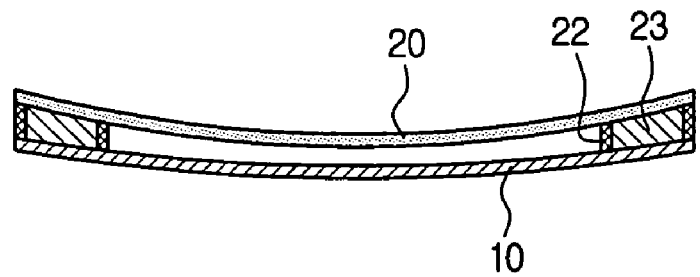
Figure 3:
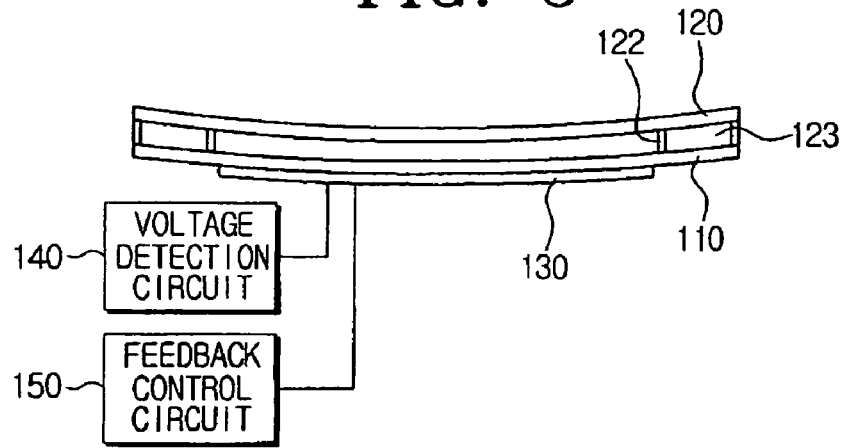
FIG. 3 is a cross section view showing an LCOS display device according to an exemplary embodiment of the present invention.

FIG. 3 is a cross section view showing an LCOS display device according to an exemplary embodiment of the present invention. Referring to FIG. 3, the LCOS display device comprises a wafer 110, a glass 120, walls 122 containing sealant 123, and a thin piezo-electric layer 130. Although not shown, an electrode is further provided in the LCOS display device to connect the thin piezo-electric layer 130 to an external power source.

The thin piezo-electric layer 130 is made from a material that generates an electric charge under the pressure, and contracts and/or expands when being applied with a voltage. It is common knowledge that the thin piezo-electric layer 130 has been already used in fine ink particle-jetting of an ink jet printer. Therefore, the thin piezo-electric layer 130 is feasible to the manufacturing of an LCOS display device.

The LCOS display device of FIG. 3 is manufactured on the wafer level. Therefore, the thin piezo-electric layer 130 is attached onto a lower surface of the wafer 110, the walls 122 containing the sealant 123 are oppositely located between the wafer 110 and the glass 120, defining a predetermined cell gap, and the wafer 110 and the glass 120 are bonded to each other.

In the bonding of the wafer 110 and the glass 120, the wafer 110 and the glass 120 expand at different expansion rates by the heat, and in the process of cooling to a room temperature, the wafer 110 and the glass 120 contract with different curvatures. To keep the cell gap uniform when the wafer 110 and the glass 120 contract with the different curvature, a voltage is applied to the thin piezo-electric layer 130 attached onto the lower surface of the wafer 110 so as to expand and/or contract the thin piezo-electric layer 130. That is, the expansion and/or contraction of the thin piezo-electric layer 130 in a planar direction changes the curvature of the wafer 110, adjusting the cell gap uniform.

Figure 4A:
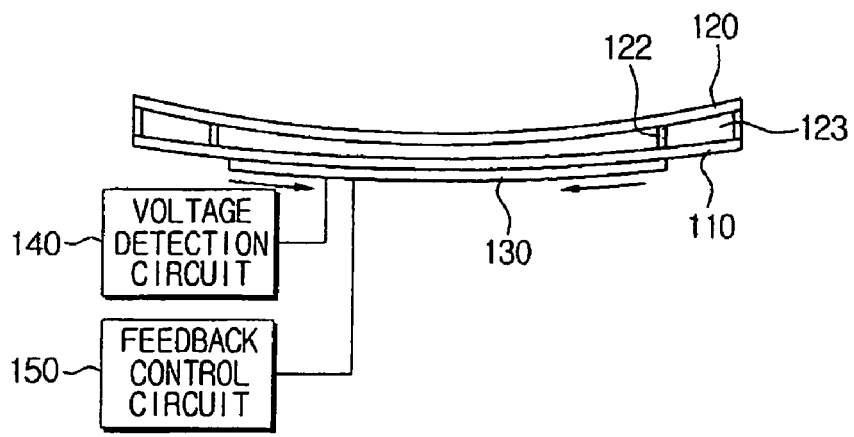
FIGS. 4A and 4B are views showing an exemplary process of adjusting the cell gap in the LCOS display device of FIG. 3.
Figure 4B:
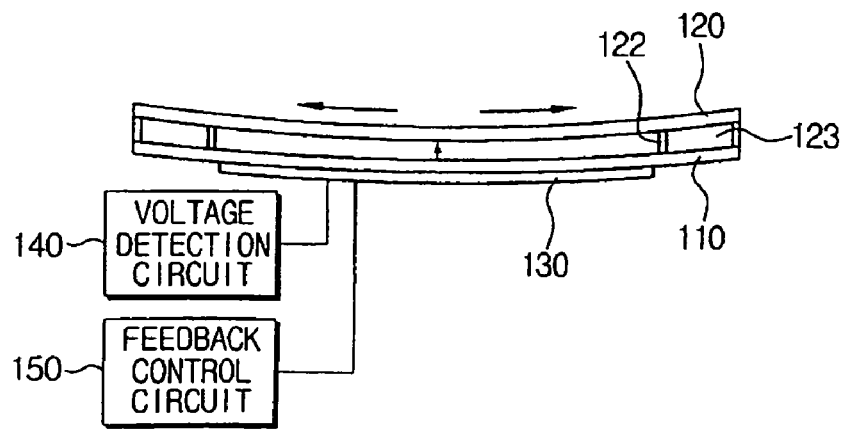

FIGS. 4A and 4B are views to explain a method of adjusting the cell gap when the cell gap between the glass 120 and the wafer 110 becomes narrowed. When the cell gap is narrowed as shown in FIG. 4A, an external voltage is applied to the thin piezo-electric layer 130 through the electrode (not shown) so that the thin piezo-electric layer 130 attached onto the lower surface of the wafer 110 contracts in the planar direction. As the thin piezo-electric layer 130 contracts in the planar direction, a radius of curvature of the wafer 110 increases and therefore, the wafer 110 straightens slightly. The increase of the radius of curvature of the wafer 110 affects the overall system as bonded, thereby changing the curvature of the glass 120. At this time, the change of curvature of the glass 120 is accentuated due to the bending of the entire system caused by the piezo-electric substance. The result is that the glass 120 has the uniformity of the cell gap as shown in FIG. 4B. When the cell gap between the glass 120 and the wafer 110 increases, the uniformity of the cell gap can be obtained by expanding the thin piezo-electric layer 130.

It is also possible to adjust non-uniformity of the cell gap that is caused by the increase of temperature during the service of the product. When there occurs deformation of the wafer 110 caused by heat or other reasons during the service of the product, the thin piezo-electric layer 130 suffers the deformation. The deformation can be compensated by detecting the voltage generated by the deformation of the thin piezo-electric layer 130. For this, the LCOS display device further comprises a voltage detection circuit (not shown) for detecting the voltage generated from the thin piezo-electric layer 130, and a feedback control circuit (not shown) for supplying a feedback voltage to the electrode connected to the thin piezo-electric layer 130 according to the voltage detected by the voltage detection circuit.

In the manufacturing of the LCOS display device as described above, the thin piezo-electric layer 130 is not necessarily a flat type, and may be a convex or concave type so that the curvature of the wafer 110 can be more easily adjusted. Also, the thin piezo-electric layer 130 is not necessarily attached in a single plate shape. The thin piezo-electric layer 130 may be partially attached to a part of a screen unit.

As described above, in the manufacturing of the LCOS display device, uniformity of the cell gap can be achieved by only adjusting the voltage level of the thin piezo-electric layer 130 attached onto the wafer 110 after bonding the wafer 110 and the glass 120, and therefore, it is not required to use spacers. Accordingly, even when the deformation shape of the cell gap slightly differs depending on the position of the wafer 110, since the cell gap can be adjusted through the same process, the yield of production is increased. Also, when the wafer 110 suffers deformation due to heat or other reasons during the service of product, the deformation can also be compensated. Accordingly, the image quality is stabilized and the lifespan of the product is prolonged.

While exemplary embodiments of the present invention have been described, additional variations and modifications of the embodiments may occur to those skilled in the art once they learn of the basic inventive concepts. Therefore, it is intended that the appended claims shall be construed to include both the above embodiments and all such variations and modifications that fall within the spirit and scope of the invention.

What is claimed is:

1. A liquid crystal on silicon (LCOS) display device comprising:
   a wafer;
   a glass;
   walls formed between the glass and the wafer to define a cell gap;
   a piezo-electric layer coupled to a surface of the wafer; and
   an electrode being applied with an external power to at least one of expand and contract the piezo-electric layer, wherein the cell gap maintains a constant width due to the at least one of the expansion and the contraction of the piezo-electric layer.

2. The LCOS device as claimed in claim 1, wherein the piezo-electric layer is coupled to a lower surface of the wafer.

3. The LCOS device as claimed in claim 1, further comprising:
   a voltage detection unit which detects a voltage generated by deformation of the piezo-electric layer; and
   a feedback control unit which compensates for the deformation of the piezo-electric layer according to the voltage detected by the voltage detection unit.

4. The LCOS device as claimed in claim 1, wherein the walls are formed at opposite ends of an upper surface of the wafer.

5. A method of adjusting a cell gap of a liquid crystal on silicon display device having a piezo-electric layer, the method comprising:
   detecting a voltage generated by deformation of the piezo-electric layer;
   supplying a feedback voltage to an electrode connected to the piezo-electric layer according to the voltage detected.

6. The LCOS device as claimed in claim 1, wherein the piezo-electric layer is disposed to cause a curvature of the wafer to change so as to adjust the cell gap.

7. The method as claimed in claim 5, wherein the piezo-electric layer expands and contracts based on the feedback voltage so as to adjust the cell gap.

* * * * *